US012804004B2

(12) United States Patent
Beaudoin

(10) Patent No.: US 12,804,004 B2
(45) Date of Patent: Nov. 17, 2026

(54) OPTIMIZED RESOURCE ENDPOINT VALIDATION

(71) Applicant: Shopify Inc., Ottawa (CA)

(72) Inventor: Francis Beaudoin, Québec (CA)

(73) Assignee: SHOPIFY INC., Ottawa (CA)

( * ) Notice: Subject to any disclaimer, the term of this patent is extended or adjusted under 35 U.S.C. 154(b) by 395 days.

(21) Appl. No.: 18/533,838

(22) Filed: Dec. 8, 2023

(65) Prior Publication Data

US 2025/0193223 A1 Jun. 12, 2025

(51) Int. Cl.
*H04L 9/40* (2022.01)

(52) U.S. Cl.
CPC ........ *H04L 63/1433* (2013.01); *H04L 63/104* (2013.01); *H04L 63/20* (2013.01)

(58) Field of Classification Search
CPC .... H04L 63/1433; H04L 63/104; H04L 63/20
USPC .......................................................... 726/22
See application file for complete search history.

(56) References Cited

U.S. PATENT DOCUMENTS 8,397,059 B1 * 3/2013 Ferguson ............. H04L 9/3271 713/168
8,688,601 B2 4/2014 Jaiswal
9,282,098 B1 * 3/2016 Hitchcock ............... H04L 67/56
2010/0235901 A1 * 9/2010 Simpkins ............ H04L 67/1001 709/227
2014/0223537 A1 * 8/2014 Islam ...................... H04L 63/20 726/12
2016/0094557 A1 * 3/2016 Kadur .................. H04W 12/06 726/3
2016/0342738 A1 11/2016 Stalling et al.
2018/0285599 A1 10/2018 Praveen et al.
2019/0303611 A1 10/2019 Lefor et al.
2021/0326537 A1 10/2021 Liu et al.
2022/0006786 A1 * 1/2022 Ogrinz ................ H04L 63/0263
2022/0121778 A1 4/2022 Padgett et al.

* cited by examiner

*Primary Examiner* — Teshome Hailu

(57) ABSTRACT

Some resource endpoints on some service servers may not be secure, as the service servers may not properly validate one or more authentication elements in requests from client devices for resources at the resource endpoints. A proxy server situated between the client devices and service servers may test endpoints by purposefully sending test requests including invalid authentication elements. However, it may not be possible for the proxy server to know every resource endpoint or to test every endpoint. In some embodiments, the proxy server may relay a plurality of requests originating from the client devices to the service servers, each request of the plurality of requests addressing a corresponding endpoint at the service servers; group the plurality of requests into a plurality of address groups based on the corresponding endpoint included in each request; and for an address group of the plurality of address groups, perform a security test.

20 Claims, 6 Drawing Sheets

OPTIMIZED RESOURCE ENDPOINT VALIDATION

BACKGROUND

Service servers of service providers often include a plurality of computer interface addresses (e.g., application programming interface (API) endpoints including uniform resource locators (URLs) and uniform resource indicators (URIs)) to allow applications running on the service servers to communicate with software applications running on client devices and/or other computer systems.

SUMMARY

A particular application running on a service server may include a large number of interface addresses (e.g., API endpoints or more generally resource endpoints) which allow the application to communicate with applications running on client devices and/or other computer systems outside of the service server. A client device may transmit a request addressing a particular resource endpoint to request certain resources from the service server. The request may also include one or more authentication elements to be used by the service server to authenticate the client device before providing the requested resources to the client device. In some situations, a proxy server (such as an e-commerce platform server) situated between the client device and the service server may relay the request from the client device to the service server. The proxy server may authenticate the client device on behalf of the service server, and this authentication may be added to the relayed request as the one or more authentication elements. The service server may validate the one or more authentication elements in the relayed request before providing the requested resource to the client device. In some situations, the service server may provide the requested resource to the proxy server which may provide the requested resource to the client device on behalf of the service server.

However, some resource endpoints on some service servers may not be secure, as the corresponding service servers may not properly or consistently validate one or more authentication elements in requests. This can result in sensitive resources being displayed on or transmitted to unauthenticated client devices improperly. In situations where the proxy server provides the requested resources on behalf of the service server, the proxy server may inadvertently improperly display the sensitive resource, which may reflect poorly on a security of the proxy server. As a possible solution, the proxy server may test resource endpoints on service servers by purposefully sending test requests including known invalid authentication elements therein and then comparing resources returned by the service servers in response to the test requests with the resources returned in response to an actual requests. However, it may not be possible for the proxy server to know every resource endpoint of different service servers ahead of time to test such resource endpoints. Further, the resource endpoints may also change over time as software applications hosted by the service servers are modified and updated, and some resource endpoints may fall out of use due to such updates or even due to retirement of the associated software application. Additionally, testing too many resource endpoints may overload service servers, which may result in an insufficient resource error code being returned by a service server, and may even result in the service server blocking requests originating from the proxy server due to exceeding set request frequency limits. Additionally, comparing the test resources returned by the service servers in response to the test requests with the actual resources returned in response to the actual requests may be difficult in situations where the test request varies too significantly from the actual requests.

According to one embodiment, a computer-implemented method is provided. The computer-implemented method may include: relaying, via a proxy server in communication with client devices and service servers, a plurality of requests originating from the client devices to the service servers, each request of the plurality of requests addressing a corresponding endpoint at the service servers; grouping, by the proxy server, the plurality of requests into a plurality of address groups based on the corresponding endpoint included in each request; and for an address group of the plurality of address groups, performing a security test.

In some embodiments, performing the security test may involve: selecting, with the proxy server, a selected request from the address group, wherein the selected request includes a selected endpoint at the service servers and a selected authentication element; modifying, with the proxy server, the selected authentication element to generate a test request including the selected endpoint and a test authentication element; and transmitting, with the proxy server, the test request to the selected endpoint.

In some embodiments, the method may further involve storing, by the proxy server, the plurality of requests to maintain a directory of endpoints at the service servers.

In some embodiments, grouping the plurality of requests may further involve grouping requests of the plurality of requests which have a same endpoint except for an identifier in that same endpoint together into an address group of the plurality of address groups.

In some embodiments, identifiers in endpoints in a same address group of the plurality of address groups may vary within an identifier match standard.

In some embodiments, the identifier in the same endpoint may include at least one of a resource identifier, a user identifier, an email identifier or an alphanumeric identifier.

In some embodiments, the selected request may be selected from the address group randomly or may be selected from the address group based on at least one characteristic associated with the selected request.

In some embodiments, selecting the selected request from the address group may involve selecting a plurality of selected requests from the address group. In other embodiments, modifying the selected authentication element of the selected request to generate the test request may involve modifying corresponding authentication elements in each selected request of the plurality of selected requests to generate a plurality of test requests.

In some embodiments, the method may further involve: receiving, at the proxy server, a test response from the selected endpoint in response to the test request; and comparing, by the proxy server, the test response to an actual response received from the selected endpoint in response to the selected request to determine security of the selected endpoint.

In some embodiments, the method may further involve: receiving, at the proxy server, a test response from the selected endpoint in response to the test request; and assessing, by the proxy server, the test response for personal information to determine security of the selected endpoint.

In some embodiments, the security of the selected endpoint may be extrapolated as security of a plurality of endpoints within the address group or as security of the address group.

According to another embodiment, a system is provided. The system includes: at least one processor of a proxy server, the proxy server in communication with client devices and service servers; and a memory storing processor-executable instructions. The processor-executable instructions, when executed, cause the at least one processor to: relay a plurality of requests originating from the client devices to the service servers, each request of the plurality of requests addressing a corresponding endpoint at the service servers; group the plurality of requests into a plurality of address groups based on the corresponding endpoint included in each request; and for an address group of the plurality of address groups, perform a security test.

In some embodiments, the processor-executable instructions that cause the at least one processor to perform the security test may include processor-executable instructions that cause the at least one processor to: select a selected request from the address group, wherein the selected request includes a selected endpoint at the service servers and a selected authentication element; modify the selected authentication element to generate a test request including the selected endpoint and a test authentication element; and transmit the test request to the selected endpoint.

In some embodiments, the memory may further store processor-executable instructions that cause the at least one processor to store the plurality of requests to maintain a directory of endpoints at the service servers.

In some embodiments, the processor-executable instructions that cause the at least one processor to group the plurality of requests may include processor-executable instructions that cause the at least one processor to group requests of the plurality of requests which have a same endpoint except for an identifier in the same endpoint together into an address group of the plurality of address groups.

In some embodiments, identifiers in endpoints in a same address group of the plurality of address groups may vary within an identifier match standard.

In some embodiments, the processor-executable instructions that cause the at least one processor to select the selected request may include processor-executable instructions that cause the at least one processor to select the selected request from the address group randomly or based on at least one characteristic associated with the selected request.

In some embodiments, the memory may further store processor-executable instructions that cause the at least one processor to: receive a test response from the selected endpoint in response to the test request; and compare the test response to an actual response received from the selected endpoint in response to the selected request to determine security of the selected endpoint or assess the test response for personal information to determine the security of the selected endpoint.

In some embodiments, the memory may further store processor-executable instructions that cause the at least one processor to extrapolate the security of the selected endpoint as security of a plurality of endpoints within the address group or as security of the address group.

According to another embodiment, there is provided a non-transitory computer-readable storage medium having stored thereon computer-executable instruction that, when executed, cause at least one processor of a proxy server in communication with client devices and service servers to perform operations including: relaying a plurality of requests originating from the client devices to the service servers, each request of the plurality of requests addressing a corresponding endpoint at the service servers; grouping the plurality of requests into a plurality of address groups based on the corresponding endpoint included in each request; and for an address group of the plurality of address groups, performing a security test.

Other aspects and features of the present disclosure will become apparent to those ordinarily skilled in the art upon review of the following description of specific embodiments of the disclosure in conjunction with the accompanying figures.

BRIEF DESCRIPTION OF DRAWINGS

Reference will now be made, by way of example, to the accompanying drawings which show example embodiments of the present application, and in which.

DETAILED DESCRIPTION

For illustrative purposes, specific example embodiments will now be explained in greater detail below in conjunction with the figures. In some of the embodiments below, examples are presented in the context of an e-commerce platform. However, the methods and systems disclosed herein are not limited to e-commerce and are instead applicable to any scenario in which it is desired to test interface addresses of different content servers.

Figure 1:
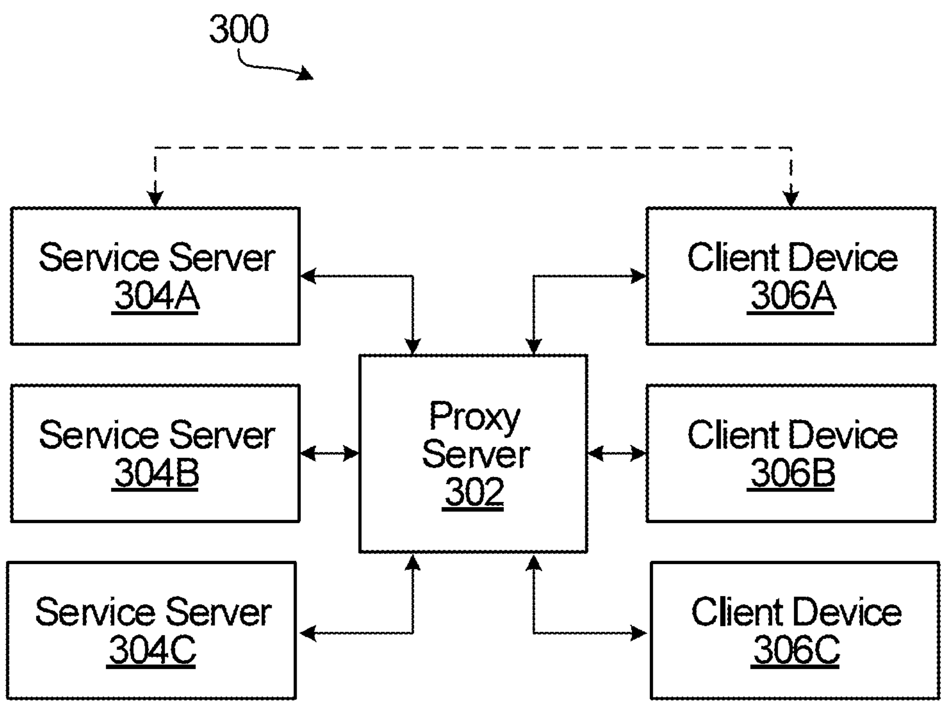
FIG. 1 is a is a block diagram of a system for relaying client requests to service servers and relaying resource responses to client devices, including a proxy server, the service servers and the client devices in accordance with one embodiment.

Referring to FIG. 1, a block diagram illustrating a computing system in accordance with one embodiment is shown generally at 300. The computing system 300 includes a proxy server 302, a plurality of service servers 304 (illustrated as 304A-304C in FIG. 1, reference character "304" as used herein may refer to any one service server of the plurality of service servers or the plurality of service servers as a whole), and a plurality of client devices 306 (illustrated as 306A-306D in FIG. 1, reference character "306" as used herein may refer to any one client device of the plurality of client devices or the plurality of client devices as a whole).

The service servers 304 may host or store resources provided by different resource providers, such as in corresponding storage memories of the service servers 304. The expression "resource" as used herein refers to any information or data which can be made available electronically to the client devices 306 and/or the proxy server 302 and may include websites, webapps, computer applications, mobile applications, text-based data, and multimedia data such as image data, audio data and video data, etc. The service servers 304 may also provide users, such as merchants users and customer users, of the client devices 306 with one or more services via the resources stored or hosted by the service servers 304, such as payment management services and shipping management services. The service servers 304 may comprise any computer or program that provides resources to other computers, programs, or client devices either in the same computer or over a local network or over a public network such as the internet. As non-limiting examples, the service servers 304 may be application, communication, mail, database, proxy, fax, file, media, web, peer-to-peer, standalone, software, or hardware servers (i.e., server computers) and may use any server format know to one of ordinary skill in the art. The service servers 304 may include corresponding processors for performing the operations of the service servers 304 (e.g., by executing instructions stored in corresponding program memories of the service servers 304), corresponding storage memories for hosting or storing resources as described below, and corresponding network interfaces (e.g., a transmitter/receiver with an antenna or a network interface card or a port) for communicating with the proxy server 302 and/or the client devices 306. In the embodiment shown in FIG. 1, three service servers 304A, 304B and 304C are shown; in other embodiments, a greater number or a fewer number of service servers 304 may be in communication with the proxy server 302 and/or the client devices 306.

Resources stored or hosted by the service servers 304 may be stored in the corresponding storage memories of the service servers 304 associated with an interface address (e.g., resource endpoint) which allow the client devices 306 and/or the proxy server 302 to retrieve the resources at the corresponding resource endpoint. The resource endpoints may comprise application programing interface (API) endpoints on the service servers 304. For example, the resource endpoint for a particular resource may be a unique IP address, a human-readable unique resource locator (URL) or a unique resource indicator (URI) identifying a location of the particular resource in the corresponding storage memories of the service servers 304. The client devices 306 may submit a client request directly to the service servers 304 (e.g., a direct client request) to retrieve a particular resource hosted on the service servers 304 by including the corresponding resource endpoint of the particular resource in the client request. The client devices 306 may also submit a client request indirectly to the proxy server 302 (e.g., an indirect client request) to retrieve a particular resource hosted on the service servers 304, again by including the corresponding resource endpoint in the client request. The proxy server 302 may then relay the client request to the service servers 304 (e.g., a proxy request) on behalf of the client devices 306 as described below. In response to either the client request or the proxy request for resources, the service servers 304 may transmit the requested resources (e.g., a resource response) directly to the client devices 306 or may transmit the resources to the proxy server 302. The proxy server 302 may then relay the requested resources to the client devices 306. Utilizing the proxy server 302 to relay requests and responses between the client devices 306 and the service servers 304 may reduce latency and response times for the service servers 304 to transmit the resource response in response to the request, as the proxy server 302 may authenticate the client device 306 on behalf of the service servers 304 in some embodiments, which reduces the need for service servers 304 to perform a more complex separate authentication process. Further, utilizing the proxy server 302 to relay requests and responses between the client devices 306 and the service servers 304 may also improve security of the client devices 306 relative to the service servers 304 and vice versa, as the client devices 306 and the service servers 304 may never directly transmit requests and responses to each other. Further still, utilizing the proxy server 302 to relay requests and responses may also allow the proxy server 302 to perform periodic security tests on the resource endpoints of the service servers 304 to determine whether the service servers 304 are properly authenticating requests relayed by the proxy server 302 as described below.

As noted above, the client devices 306 may request resources hosted or stored by the service servers 304 by submitting client requests to the service servers 304 and/or the proxy server 302 (which then relays the proxy request to the service servers 304). A client device 306 may be, for example, a mobile phone, or a tablet, or a laptop, or a personal computer, etc. A client device 306 may include a processor for performing the operations of the client device 306 (e.g., by executing instructions stored in a program memory of the client device 306), a network interface (e.g., a transmitter/receiver with an antenna or a network interface card or a port) for communicating with the proxy server 302 and the service servers 304 and a user interface (e.g., keyboard, display, and/or touchscreen). In the embodiment shown in FIG. 1, three client devices 306A, 306B and 306C are shown; in other embodiments, a greater number or a fewer number of client devices 306 may be in communication with the proxy server 302 and/or the service servers 304.

A particular client device 306 (or a particular session on the particular client device 306) may also be associated with a user and may be uniquely identified with a user identifier. A client request originating from the particular client device 306 (or the particular session) may include a user identifier, which may be at least one of a user ID or a secure user ID. The user ID may be a unique identifier (e.g., alphanumeric string) assigned to the particular client device 306 (or the particular session) so that the particular client device 306 (or the particular session) can be identified across multiple interactions between the client device 306 and the proxy server 302 and/or the service servers 304. The user ID may be generated by the proxy server 302 and/or the service servers 304 when the client device 306 (or the particular session) is logged into a website or webapp associated with the proxy server 302 and/or the service servers 304, such as with an authorized username and password. The secure user ID may be an encrypted version of the user ID or a more secure version of the user ID, and may be a randomly generated identifier (e.g., another alphanumeric string). The user identifier (e.g., at least one of the user ID, the secure user ID, or some other identifier) may be stored as a HTTP cookie associated with the particular client device 306 (or the particular session) and may be carried in an HTTP header in the client requests transmitted by the client device 306 to the service servers 304 and/or the proxy server 302. In some embodiments, the user identifier (e.g., at least one of the user ID, the secure user ID, or some other identifier) may be considered one or more authentication elements of the client requests originating from the particular client device 306 (or the particular session).

Proxy Server 302

Figure 2:
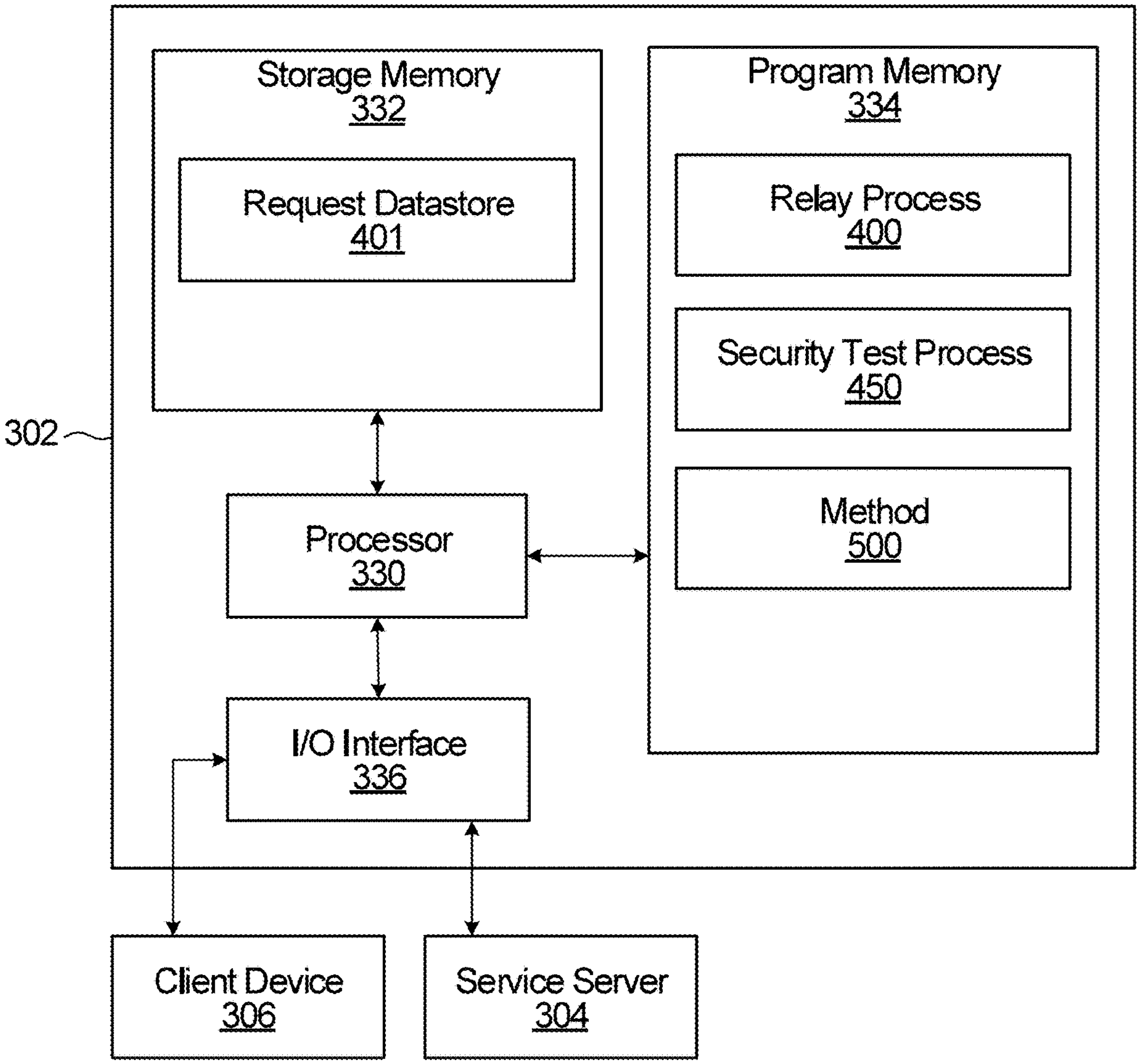
FIG. 2 is a schematic of the proxy server of FIG. 1 in accordance with one embodiment.

Still referring to FIG. 1, in the embodiment shown, the proxy server 302 is positioned between the client devices 306 and the service servers 304. The proxy server 302 may be configured to one or more of: (a) relay client requests for resources from the client devices 306 to the service servers 304; (b) authenticate the client device 306 on behalf of the service server 304; (c) relay resource responses provided by the service servers 304 back to the client devices 306; and (d) perform periodic security tests on the resource endpoints of the service servers 304. One embodiment of the proxy server 302 is shown in FIG. 2; in this embodiment shown, the proxy server 302 includes at least one processor 330, and a storage memory 332, a program memory 334 and an input/output (I/O) interface 336 all in communication with the processor 330. Other embodiments of the proxy server 302 may include fewer, additional or alternative components. Additionally, although only a single processor 330, a single storage memory 332, a single program memory 334, and a single I/O interface 336 is shown in FIG. 2, other embodiments of the proxy server 302 may include more than one of each of these components.

The storage memory 332 stores information received or generated by the processor 330 and may generally function as an information or datastore. In the embodiment shown, the storage memory 332 includes a request datastore 401; in other embodiments, the storage memory 332 may include fewer, additional or alternative datastores. The program memory 334 stores various blocks of code (alternatively called processor, machine and/or computer-executable instructions), including codes for directing the processor 330 to perform various processes, such as a relay process 400, a security test process 450, and a method 500 described below. The program memory 334 may also store database management system codes for managing the datastores in the storage memory 332. In other embodiments, the program memory 334 may store fewer, additional or alternative codes for directing the processor 330 to execute additional or alternative functions. The storage memory 332 and the program memory 334 may each be implemented as one or a combination of a non-transitory computer-readable and/or non-transitory machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching thereof). The expression "non-transitory computer-readable medium" or "non-transitory machine-readable medium" as used herein is defined to include any type of computer-readable storage device and/or storage disk and to exclude propagating signals and to exclude transmission media.

The I/O interface 336 comprises an interface for receiving and transmitting information between the proxy server 302 and different components within the computing system 300. For example, the proxy server 302 may receive the client requests from the client devices 306, transmit the proxy requests or test requests to the service servers 304, receive actual resource responses or test resource responses from the service servers 304 and transmit the actual resources to the client devices 306 over public or private network (such as a wireless network or a wired network) via the I/O interface 336. The I/O interface 336 may include any communication interface which enables the processor 330 to communicate with external components, including specialized or standard I/O interface technologies such as channel, port-mapped, asynchronous for example. In some embodiments, the I/O interface 336 may be implemented using a network interface card (NIC), a port, and/or a network socket.

The processor 330 is configured to execute codes stored in the program memory 334, to retrieve information from and store information into the datastores of the storage memory 332, to process the information, and to receive and transmit information to different components within the computing system 300 over the I/O interface 336, examples of which are described below. In the embodiment shown, the processor 330 is a server central processing unit and may be a multi-core processor.

Relay Process 400

Figure 3:
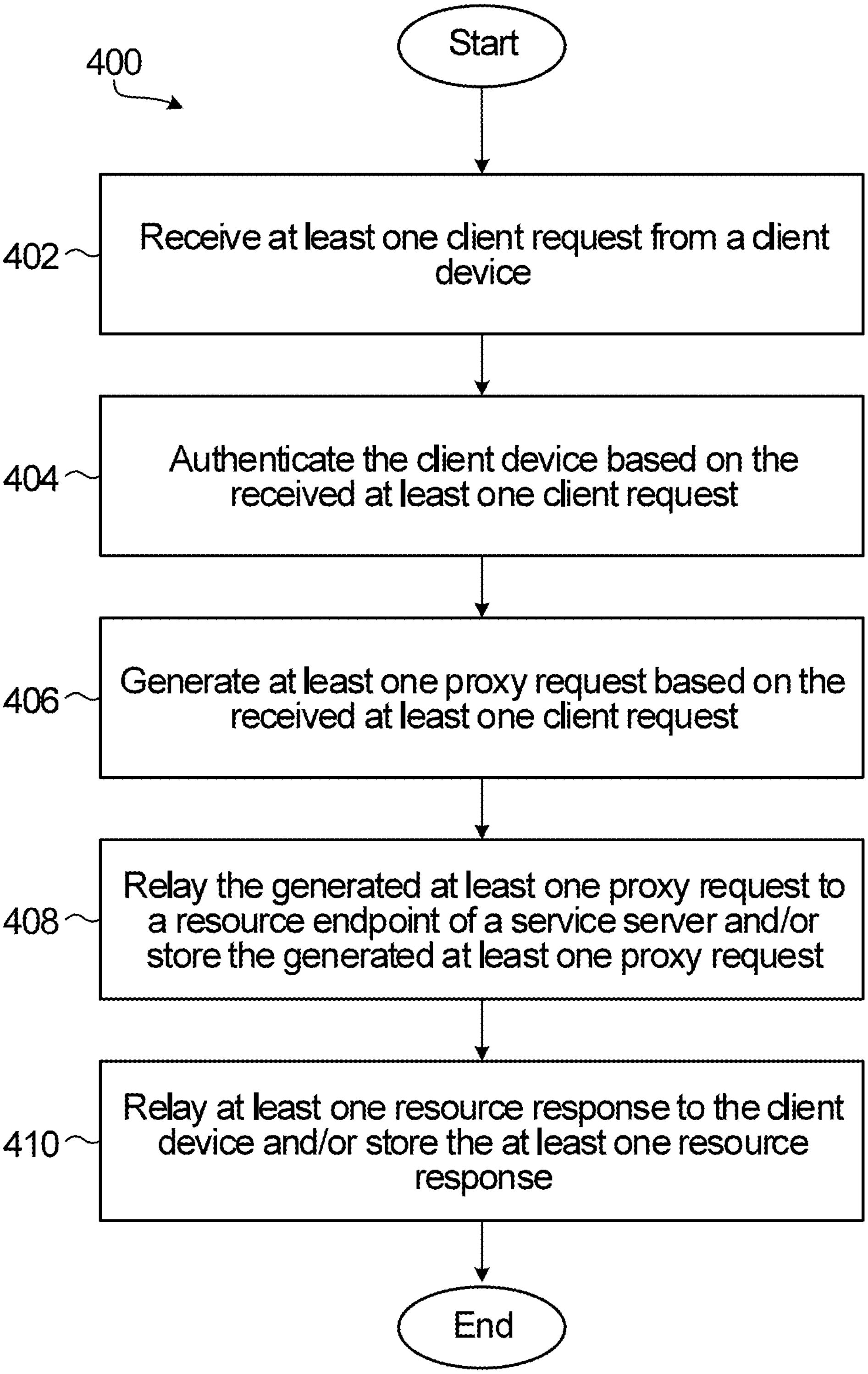
FIG. 3 is a flowchart of a relay process performed at the proxy server in accordance with one embodiment.

In some embodiments, the proxy server 302 may be configured to (a) relay at least one proxy request to the service servers 304 in response to receiving at least one client request from the client devices 306, (b) authenticate the client device 306 on behalf of the service server 304 and (b) relay at least one resource response to the client devices 306 in response to receiving at least one resource response from the service servers 304. Referring to FIGS. 2 and 3, a computer-implemented relay process for relaying the at least one proxy request to the service servers 304 and the at least one resource response to the client devices 306 in accordance with one embodiment is generally shown at 400. As described above, utilizing the proxy server 302 to relay client requests and resource responses between the client devices 306 and the service servers 304 may reduce latency and response times for the service servers 304 to transmit the resource (as the proxy server 302 may authenticate the client device 306 on behalf of the service servers 304 in some embodiments), may improve security of the client devices 306 relative to the service servers 304 and vice versa (as the client devices 306 and the service servers 304 may never directly transmit client requests and resource responses to each other), and may also allow the proxy server 302 to perform periodic security tests on the resource endpoints of the service servers 304 using the security test process 450 as described below.

In the embodiment shown, the relay process 400 is performed by the processor 330 executing processor, machine and/or computer readable instructions stored in the program memory 334. In other embodiments, the relay process 400 may comprise processor, machine and/or computer readable instructions alternatively stored on other non-transitory computer readable storage medium such as a CD-ROM, a floppy disk, a hard drive, a DVD, a Blu-ray disk or another component associated with the proxy server 302; in yet other embodiments, the relay process 400 and/or parts thereof could alternatively be executed by a device other than the processor 330, including for example, by the client devices 306. Further, although the relay process 400 in accordance with one embodiment is described with reference to the flowchart illustrated in FIG. 3, other methods of implementing the relay process 400 may alternatively be used. For example, the order of execution of the blocks shown in FIG. 3 may be altered, and/or some of the blocks described may be altered, eliminated, or combined.

In the embodiment shown in FIG. 3, the relay process 400 begins at block 402, which may include codes directing the processor 330 to receive a client request from a particular client device 306 of the plurality of client devices 306. As described above, in some embodiments, a client request may include data including (a) the corresponding resource endpoint at the service servers 304 to retrieve a resource; and (b) the user identifier identifying the particular client device 306 (or the particular session) from which the at least one client request originates. As a more specific example, a particular client device 306 may transmit a client request to retrieve a particular review (e.g., resource) from a review service server 304 for a product that a user of the client device 306 sells. The resource endpoint at the review service server 304 may be "server.com/api/awesome_reviews/reviews/{review_id}", where {review_id} may be a unique identifier of the particular review for the product of the user of the particular client device 306. In some embodiments, only the user of the client device 306 is authorized to retrieve that particular review, such as in situations where the particular review is not yet public. Accordingly, in some embodiments, the user of the client device 306 may be logged into a website or webapp associated with the proxy server 302 and/or the review service server 304 at the time of generating the client request, such the client request may include a valid user identifier. For example, the client request may include (a) "server.com/api/awesome_reviews/reviews/{review_id}" as the resource endpoint and (b) "user_id=abcd1234" as the user ID which forms the user identifier. In other embodiments, the user of the client device 306 may not be logged into the proxy server 302 and/or review service server 304 at the time of generating the client request, such that the client request may not include a valid user identifier. For example, the client request may include (a) "/apps/awesome_reviews/path/reviews/{id}" as the resource endpoint and (b) "user_id=null" as the user ID which forms the secure user ID.

In response to receiving the at least one client request at block 402, the relay process 400 may then continue to block 404, which may include codes directing the processor 330 to authenticate the client device 306 (or the particular session) based on the received at least one client request. For example, block 404 may direct the processor 330 to determine whether the at least one client request includes a user ID indicating that the user of the client devices 306 is logged into the website or webapp associated with the proxy server 302 and/or the review service server 304. The processor 330 may generate a login tag indicating the user is logged in if the user is logged in or a login tag indicating the user is not logged in if the user is not logged in.

Referring to the more specific example described above, in situations where the user is logged in (if the at least one client request includes a user ID (e.g., "user_id=abcd1234")), block 404 may direct the processor 330 to process the at least one client request and generate a "logged_in_user_id=abcd1234" which functions as a log in tag indicating the user is logged in. The processor 330 may then encrypt the at least one client request (e.g., the entire at least one client request or a portion thereof) using a hash-based message authentication code (HMAC), such as HMAC-SHA256 and/or HMAC-SHA3-512 to generate the signature. Referring to the more specific example described above, block 404 may direct the processor 330 to process the at least one client request and generate a signature comprising "signature=4c68c8624d737112c91818c11017d24 d334b524 cb5c2b8ba08daa056f7395ddb".

Alternatively, in situations where the user is not logged in (e.g., if the at least one client request does not include a user ID (e.g., "user_id=null")), block 404 may direct the processor 330 to first encrypt the at least one client request (e.g., the entire at least one client request or a portion thereof) using a hash-based message authentication code (HMAC), such as HMAC-SHA256 and/or HMAC-SHA3-512 to generate the signature. For example, block 404 may direct the processor 330 to process the at least one client request and generate a signature comprising "signature=4c68c8624d737112c91818c2019d24d334b524cb5c2b8ba08 daa890987ddb". Block 404 may then direct the processor 330 to generate an authentication parameter associated with the encryption process or the signature to function as the login tag to indicate the user is not logged in. For example, the encryption of the at least one client request may generate an identifier associated with a secure to which can be used to de-encrypt the at least one client request, e.g., "secure_token=2345554345efghi" which may function as the login tag indicating that the user is not logged in.

In some embodiments, the login tag and the signature may be used as one or more authentication elements of proxy requests generated by the proxy server 302. The login tag may generally allow the proxy server 302 to generate test requests, particularly encrypted test requests, which are not significantly different than actual requests (e.g., including a valid signature as described above), and which may allow more consistent comparisons between test requests and actual requests.

The relay process 400 may then continue to block 406, which may include codes directing the processor 330 to generate at least one proxy request based on the at least one client request and/or the one or more authentication elements generated at block 404.

In some embodiments, block 406 may direct the processor 330 to append the one or more authentication elements generated at block 404 or other elements (e.g., a timestamp of receipt of the at least one client request at the proxy server 302 at block 402) into the at least one client request to generate the at least one proxy request. In such embodiments, the at least one proxy request may include (a) the corresponding resource endpoint at the service servers 304, (b) the user identifier identifying the particular client device 306 (or the particular session) (e.g., the user ID or the secure user ID), (c) one or more authentication elements generated at block 404 (e.g., the login tag and/or the signature) and (d) a timestamp. Referring to the specific example described above where the user is logged in, the at least one proxy request may include (a) "server.com/api/awesome_reviews/reviews/{review_id}" as the resource endpoint; (b) "user_id=abcd1234" as the user identifier, (c) "logged_in_user_id=abcd1234" and/or "signature=4c68c8624d737112c91818c11017 d24d334b524cb5c2b8ba08daa056f7395ddb" as the one or more authentication elements; and (d) "timestamp=131732678" as the timestamp. Referring to the specific example described above where the user is not logged in, the at least one proxy request may include (a) "server.com/api/awesome_reviews/reviews/{review_id}" as the resource endpoint; (b) "user_id=null" as the user identifier, (c) "secure_token=2345554345efghi" and/or "signature=4c68c8624d737112c91818c2019d24d334b 524cb5c2b8ba08daa890987ddb" as the one or more authentication elements; and (d) "timestamp=131732678" as the timestamp. In other embodiments, the at least one proxy request may also include the user identifier identifying the particular client device 306 (or the particular session) (e.g., the user ID or the secure user ID). In such embodiments, one or more of the user ID, the secure ID, the login tag and the signature may be used as one or more authentication elements of the at least one proxy request.

In other embodiments, block 406 may direct the processor 330 to modify the at least one client request to remove information which can be used to identify the client device 306 (e.g., the user identifier or other components of HTTP cookies included in the at least one client request). In such embodiments, the at least one proxy request may include (a) the corresponding resource endpoint at the service servers 304; (b) one or more authentication elements generated at block 404 (e.g., the login tag and/or the signature); and (c) a timestamp. Referring to the specific example described above where the user is logged in, the at least one proxy request may include (a) "server.com/api/awesome_reviews/reviews/{review_id}" as the resource endpoint; (b) "logged_in_user_id=abcd1234" and/or "signature=4c68c8624d737112c91818c11017d24d334b524 cb5c2b8ba08daa056f7395ddb" as the one or more authentication elements; and (c) "timestamp=131732678" as the timestamp. Alternatively, and referring to the specific example described above where the user is not logged in, the at least one proxy request may include (a) "server.com/api/awesome_reviews/reviews/{review_id}" as the resource endpoint; (b) "secure_token=2345554345efghi" and/or "signature=4c68c8624d737112c91818c2019d24d334b524c b5c2b8ba08daa890987ddb" as the one or more authentication elements; and (c) "timestamp=131732678" as the timestamp. In such embodiments, one or more of the login tag and the signature may be used as one or more authentication elements of the at least one proxy request.

The relay process 400 then continues to block 408, which may include codes directing the processor 330 to relay the at least one proxy request to the resource endpoint of the service servers 304 included in the at least one proxy request. For example, block 408 may direct the processor 330 to transmit the at least one proxy request to the service servers 304 via the I/O interface 336. In some embodiments, block 408 may also include codes for directing the processor 330 to store the at least one client request (received at block 402) and/or the at least one proxy request (generated at block 406) in the request datastore 401 (shown in FIG. 2) for later use with the security test process 450 as described below. The at least one client request and the corresponding at least one proxy requests generated by based on that at least one client request may be stored associated with each other in the request datastore 401. Storing the at least one client request and/or the at least one proxy request may provide a directory of resource endpoints currently being accessed by the client devices 306, which may be inferred to be a directory of currently active resource endpoints maintained at the service servers 304. Maintaining such a directory of resource endpoints may provide the proxy server 302 with a list of resource endpoints to perform security tests on with the security test process 450 as described below, as the proxy server 302 may not know every resource endpoint of different service servers 304 ahead of time to test such resource endpoints. Further, the resource endpoints being maintained by different service servers 304 may also change over time as resources (e.g., applications, websites and webapps) stored or hosted by the service servers 304 are modified and updated over time, and some resource endpoints may fall out of use due to such updates or due to retirement of the associated resource.

In some embodiments, in response to the at least one proxy request from the proxy server 302, the service servers 304 may provide at least resource response including the requested resource directly to the particular client device 306 from which the at least one client request (received at block 402) originates. In such embodiments, the relay process 400 may end after block 408.

In other embodiments, in response to the at least one proxy request, the service servers 304 may instead provide the at least resource response including the requested resource to the proxy server 302. In such embodiments, the relay process 400 may continue to block 410, which may include codes directing processor 330 to relay the at least one resource response including the requested resource to the particular client device 306. For example, block 410 may direct the processor 330 to transmit the at least one resource response received from the service servers 304 to the particular client device 306 via the I/O interface 336. In some embodiments, block 410 may also direct the processor 330 to store the at least one resource response received from the service servers 304 in the request datastore 401 for later use with the security test process 450 as described below. The at least one resource response may be stored in the request datastore 401 associated with at least one client request and/or the at least one proxy request used to request that at least one resource response. Storing the at least one resource response may provide the processor 330 with an actual resource response to be compared with a test resource response when performing the security test process 450 as described below. The relay process 400 may then end after block 408.

Security Test Process 450

Figure 4:
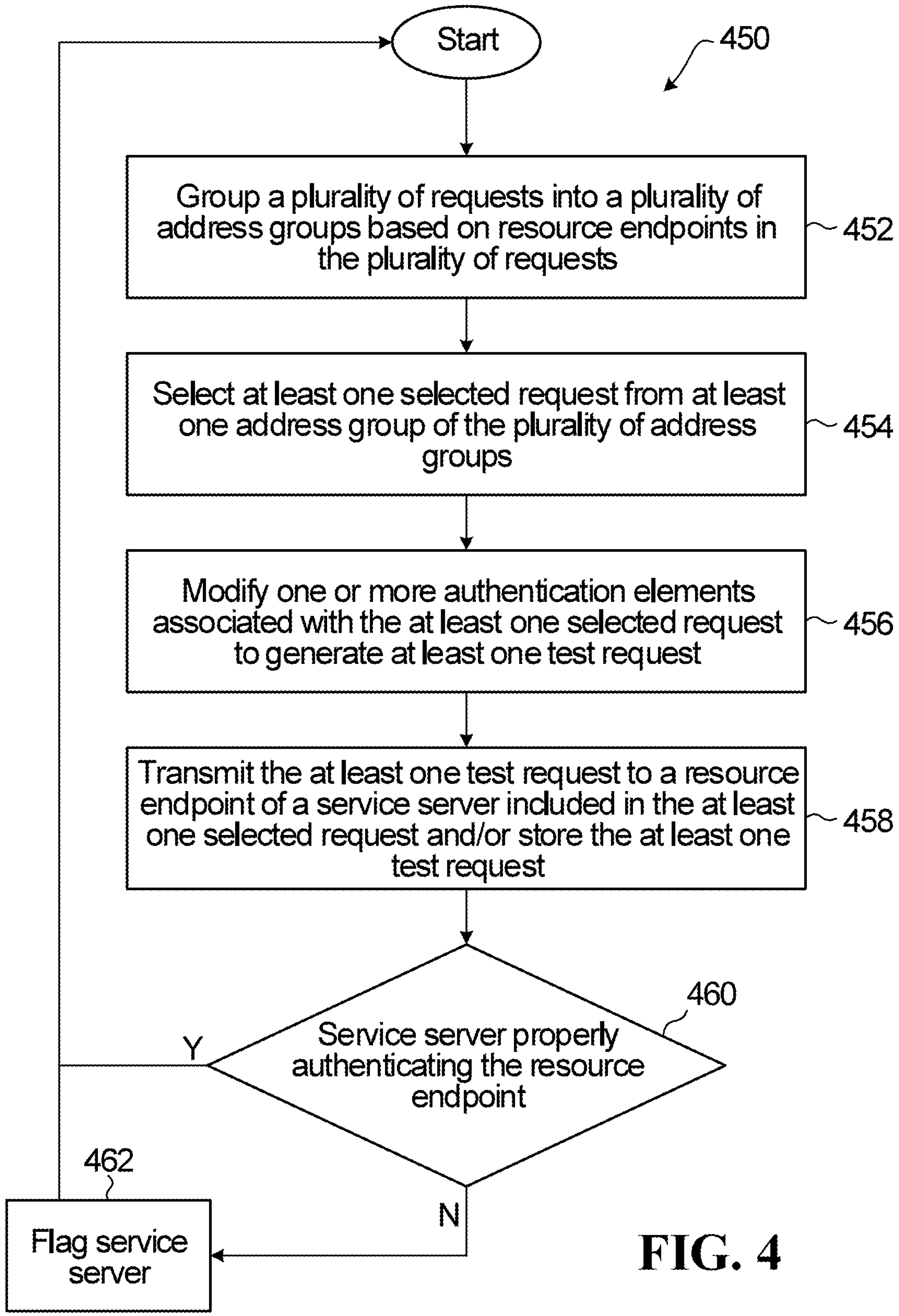
FIG. 4 is a flowchart of a security test process performed at the proxy server in accordance with one embodiment.

In some embodiments, the proxy server 302 may also be configured to perform periodic security tests on resource endpoints at the service servers 304 to ensure that the service servers 304 are processing the one or more authentication elements in the proxy requests transmitted from the proxy server 302 (or the direct client requests transmitted from the client devices 306) before providing the resource responses including the requested resource. Referring to FIGS. 2 and 4, a computer-implemented security test process for performing a security test on the service servers 304 is shown at 450. In this regard, some resource endpoints on some service servers 304 may not be secure, as some service servers 304 may not properly or consistently validate one or more authentication elements included in the proxy requests transmitted by the proxy server 302 (or included in the client requests transmitted by the client devices 306). This can result in sensitive resource responses being displayed on or transmitted to some unauthorized client devices 306 improperly. In situations where the proxy server 302 provides the resource response to the client devices 306 on behalf of the service servers 304, the proxy server 302 may inadvertently improperly display the sensitive resource response, which may reflect poorly on a security of the proxy server 302.

In the embodiment shown, the security test process 450 is performed by the processor 330 executing processor, machine and/or computer readable instructions stored in the program memory 334. In other embodiments, the security test process 450 may comprise processor, machine and/or computer readable instructions alternatively stored on other non-transitory computer readable storage medium such as a CD-ROM, a floppy disk, a hard drive, a DVD, a Blu-ray disk or another component associated with the proxy server 302; in yet other embodiments, the security test process 450 and/or parts thereof could alternatively be executed by a device other than the processor 330, including for example, by the client devices 306. Further, although the security test process 450 in accordance with one embodiment is described with reference to the flowchart illustrated in FIG. 4, other methods of implementing the security test process 450 may alternatively be used. For example, the order of execution of the blocks may be altered, and/or some of the blocks described may be altered, eliminated, or combined.

In the embodiment shown in FIG. 4, the security test process 450 begins at block 452, which may include codes for directing the processor 330 to group the plurality of client requests received at block 402 of the relay process 400 (shown in FIG. 3) or a plurality of proxy requests generated at block 406 of the relay process 400 (also shown in FIG. 3) into a plurality of address groups based on the corresponding resource endpoint included in the client or proxy requests. For example, block 452 may direct the processor 330 to retrieve the plurality of client requests and/or the plurality of proxy requests from the request datastore 401. Block 452 may then direct the processor 330 to group together the client or proxy requests into a plurality of address groups based on the corresponding resource endpoint included in the client or proxy requests. In one embodiment, the proxy server 302 may group resource endpoints which have the same resource endpoint except for an identifier in the same resource endpoint together into a particular address group. This allows the proxy server 302 to deduplicate resource endpoints which only vary by an identifier and allow the proxy server 302 to perform the security test on one resource endpoint or a few resource endpoints of a particular address group. In this regard, if the security test on an resource endpoint having a first identifier (e.g., referring to the specific example of the service servers 304 hosting or storing reviews, "server.com/api/awesome_reviews/reviews/123456") passes or fails, it may be extrapolated that that the security test on the same resource endpoint having a second identifier (e.g., "server.com/api/awesome_reviews/reviews/246810") will similarly pass or fail. In other words, the security of the resource endpoint having the first identifier is extrapolated as a security of the resource endpoint having the second identifier or as security of the address group that the resource endpoints having the first and second identifiers belong to. The identifier in the corresponding resource endpoints of client requests and/or proxy requests which are grouped together into a may be allowed to vary within an identifier match standard.

In some embodiments, the identifier in the resource endpoint may be a resource identifier ("id") of the resource hosted or stored by the service servers 304. The resource identifier may be allowed to vary within a resource identifier match standard. The resource identifier match standard may be "/^\d+$/", may be a numeric string, may be an alphabetic string or may be an alphanumeric string. Other resource identifier match standards are possible. Utilizing the more specific example described above, client and/or proxy requests including the resource endpoints "server.com/api/awesome_reviews/reviews/123456" and "server.com/api/awesome_reviews/reviews/246810" may be grouped together into a same "server.com/api/awesome_reviews/reviews/{id}" address group. However, a client and/or proxy request including the resource endpoint "server.com/api/awesome_reviews/v2/reviews/123456" may not be grouped into the "server.com/api/awesome_reviews/reviews/{id}" address group, and may instead be grouped into the "server.com/api/awesome_reviews/v2/reviews/{id}" address group.

In other embodiments, the identifier in the resource endpoint may be a user identifier ("uuid") of a user allowed to access the resource hosted or stored by the service servers 304. The user identifier may be allowed to vary within a user identifier match standard. The user identifier match standard may be "/\A[a-f\d]{8}-(?:[a-f\d]{4}-){3}[a-f\d]{12}\z/", may be a numeric string, may be an alphabetic string, or may be an alphanumeric string. Other user identifier match standards are possible. For example, client and/or proxy requests including the resource endpoints "server.com/api/awesome_reviews/user/jane", "server.com/api/awesome_reviews/user/756" and "server.com/api/awesome_reviews/user/56294254efd015" may be grouped together into a same "server.com/api/awesome_reviews/user/{uuid}" address group. However, a client and/or a proxy request including the resource endpoint "server.com/api/awesome_reviews/v4/user/jane" may not be grouped into the "server.com/api/awesome_reviews/user/{uuid}" address group, and may instead be grouped into the "server.com/api/awesome_reviews/v4/user/{uuid}" address group.

In other embodiments, the identifier in the resource endpoint may be an email identifier ("email") of a user allowed to access the resource hosted or stored by the service servers 304. The email identifier may be allowed to vary within an email identifier match standard. The email identifier match standard may be "/^.+@.+$/" or may be an alphanumeric string including an "@" after a beginning of the string and before an end of the string. Other email identifier match standards are possible. For example, client and/or proxy requests including the resource endpoints "server.com/api/awesome_reviews/user/jane@example.com", "server.com/api/awesome_reviews/user/john@example.com" and may be categorized together into a same "server.com/api/awesome_reviews/user/{email}" address group. However, a client and/or proxy request including the resource endpoint "server.com/api/awesome_reviews/v2/user/jane@example.com" may not be grouped into the "server.com/api/awesome_reviews/user/{email}" address group, and may instead be grouped into the "server.com/api/awesome_reviews/v2/user/{email}" address group.

In other embodiments, the identifier in the resource endpoint may be any alphanumeric identifier ("alphanumeric") of the interface address. The alphanumeric identifier may be allowed to vary within an alphanumeric identifier match standard. The alphanumeric identifier match standard may be /^(?=.*[a-zA-Z].*[a-zA-Z])(?=.*\d.*\d).+$/" or may be an alphanumeric string. Other alphanumeric identifier match standards are possible. For example, client or proxy requests including the resource endpoints "server.com/api/awesome_reviews/12347abe", "server.com/api/awesome_reviews/john@example.com" and "server.com/api/awesome_reviews/56294254" may be categorized together into a same "server.com/api/awesome_reviews/{alphanumeric}" address group. However, a client and/or proxy including the request resource endpoint "server.com/api/awesome_reviews/v2/john@example.com" may not be grouped into the "server.com/api/awesome_reviews/{alphanumeric}" address group, and may instead be grouped into the "server.com/api/awesome_reviews/v2/{alphanumeric}" address group.

Block 452 may direct the processor 330 to group together the client or proxy requests continuously or based on a time window. For example, in continuous embodiments, block 452 may direct the processor 330 to continuously add each newly received client requests (e.g., received at block 402) or add newly generated proxy requests (e.g., generated at block 406) an existing plurality of address groups. New address groups may be added to the existing plurality of address groups in situations where the newly received client requests or newly generated proxy requests do not fit into one of the existing plurality of address groups. In fixed time window embodiments, block 452 may instead direct the processor 330 to receive newly received client requests or newly generated proxy requests over the time window, and then generate a new plurality of address groups based on the client and/or proxy requests received over that fixed time window. The time window may be a fixed time window over a day, a week or a month. For example, the fixed time window may be between 8 AM and 6 PM each day, between each Monday at 12:00 AM and each subsequent Sunday at 11:59 PM, between the 1st and the 15th of each month, etc. The time window may also be a rolling time window, such as a defined period of time since a previous instance of block 452 was executed to group together the client or proxy requests. The defined period may be 1 hr, 12 hrs, 24 hrs, etc.

The security test process 450 then continues to block 454, which may include codes for directing the processor 330 to select at least one client or proxy request (e.g., at least one selected request) from a particular address group of the plurality of address groups (generated at block 452) to perform the security test on. Due to the grouping of the client or proxy requests into the plurality of address groups in block 452, the at least one selected request may include a resource endpoint which is representative of an entire address group. A result from performing a security test on the resource endpoint of the at least one selected request may be extrapolated to other resource endpoints of other requests within the address group. This may allow the proxy server 302 to only test a single (or a few) client or proxy requests for a particular address group of the plurality of address groups, which can reduce the number of test requests transmitted by the proxy server 302 to the service servers 304. This can reduce the likelihood of test requests originating from the proxy server 302 overloading the service servers 304, reduce the likelihood of receiving an insufficient resource error code from the service servers 304 and reduce the likelihood of exceeding set request frequency limits at the service servers 304.

Block 454 may initially direct the processor 330 to select at least one address group (e.g., at least one selected address group) from the plurality of address groups generated at block 452. In some embodiments, the at least one selected address group may be randomly selected; in other embodiments, the at least one selected address group may be selected based on characteristics associated with the client or proxy requests grouped into the at least one selected address group (e.g., such as the timestamp of the proxy requests). For example, block 454 may direct the processor 330 to select at least one address group including proxy requests which have a timestamp that indicates the corresponding client requests (which the proxy requests are generated based on) received by the proxy server 302 within a current period. This may allow the processor 330 to select at least one address group which represents a resource endpoint that is currently being maintained by the service servers 304. The current period may be within the last 12 hours, within the last 24 hours, within the last 7 days, within the last 60 days, within the last 120 days, etc. In some embodiments, block 454 may direct the processor 330 to select one address group from the plurality of address groups to perform the security test on (e.g., an address group including the proxy request which has a most recent timestamp); in other embodiments, block 454 may direct the processor 330 to select more than one address group from the plurality of address groups (e.g., every address group including a proxy request which has a timestamp within the current period).

After directing the processor 330 to select at least one selected address group, block 454 may then direct the processor 330 to select at least one client or proxy request (e.g., at least one selected request) from the at least one selected address group. In some embodiments, the at least one selected request may be randomly selected; in other embodiments, the at least one selected request may be selected based on characteristics associated with the at least one selected request, such as the timestamp of the client or proxy requests in the at least one selected address group, variations in the resource endpoints of the client or proxy requests in the at least one selected address group, status of the one or more authentication elements in the client or proxy requests in the at least one selected address group and/or which client or proxy requests in the at least one selected address group are associated with an actual resource response from the service server 304 (e.g., stored in the request datastore 401 after block 410 of the relay process 400). For example, block 454 may direct the processor 330 to select a proxy request which has a most recent timestamp that indicates the corresponding client request (which the proxy request is generated based on) was the most recent client request in the at least one selected address group received by the proxy server 302. Additionally or alternatively, block 454 may direct the processor 330 to select at least one proxy request which has a timestamp within the current period that indicates the corresponding at least one client request (which the at least one proxy request is generated based on) was received by the proxy server 302 within the current period. This may allow the processor 330 to select a most recent client or proxy request or to select at least one client or proxy request which more accurately represents a resource endpoint that is currently being maintained by the service servers 304. Additionally or alternatively, in other embodiments, block 454 may direct the processor 330 to select client or proxy requests in the at least one selected address group which have variations in the identifier of the resource endpoint, such as one client or proxy request having an identifier corresponding to a numeric string, one client or proxy request having an identifier corresponding to an alphabetic string, one client or proxy request having an identifier corresponding to an alphanumeric string, and one client or proxy request having an identifier corresponding to an alphanumeric string including an "@". This may allow the processor 330 to select client or proxy requests which capture variations in the resource endpoint being maintained by the service servers 304 and which may correspond to possible different resources responses by the service servers 304. Additionally or alternatively, in other embodiments, block 454 may direct the processor 330 to select client or proxy requests which have one or more authentication elements which indicate that the user is logged in, such as at least one client or proxy request including "user_id=abcd1234" (and not "user_id=null" for example) or at least one proxy request including "logged_in_user_id=abcd1234" (and not "secure_token=2345554345efghi" for example) as the login tag. This may allow the processor 330 to select client or proxy requests which would have resource response from the service servers 304 of logged in users (e.g., more likely to be valid/normal resource responses providing the resource) to compare a test resource response to as described below. In yet other embodiments, block 454 may direct the processor 330 to select client or proxy requests which are stored (e.g., in the request datastore 401 after block 410 of the relay process 400) in association with at least one actual resource response from the service servers 304. This may again allow the processor 330 to select client or proxy requests which would have a valid actual resource response to compare a test resource response to as described below.

Block 454 may direct the processor 330 to select the at least one selected request asynchronously with a timestamp of the at least selected request indicating when the client request used to generate the at least one selected request was received at the proxy server 302 and/or when the proxy request generated based on that client request was relayed to the resource endpoint of the service servers 304. In some embodiments, the processor 330 may select the at least one selected request after the defined period of time from the timestamp associated with the at least one selected request. In other embodiments, the processor 330 may select the at least one selected request after the defined period of time from the timestamp associated with a most recent client and/or proxy request grouped into the at least one selected address group. In other embodiments, the processor 330 may select the at least one selected request after the defined period of time has passed since a previous instance of block 454 was executed to (a) select any address group of the plurality of address groups; (b) select the same address group; (c) a request from any address group of the plurality of address groups; or (d) to select a request from the same address group. In other embodiments, the processor 330 may select the at least one selected request at a fixed time, such as at 11:59 PM each day, Monday of each week and/or the 1$^{st}$ of each month.

The security test process 450 may then continue to block 456, which may include codes for directing the processor 330 to modify one or more authentication elements included in the at least one selected request (e.g., selected authentication elements, which may be valid) into one or more test authentication elements (which may be invalid) to generate at least one test request.

For example, in embodiments where the at least one selected request comprises a client and/or proxy request, the user ID or the secure user ID may be the one or more selected authentication elements which are modified by block 456. Referring to the more specific example described above, in some embodiments where the at least one selected request is a client request, the at least selected one request may include (a) "server.com/api/awesome_reviews/reviews/{review_id}" as the resource endpoint and (b) "user_id=abcd1234" and/or "secure_user_id=2345554345efghi" as the one or more valid selected authentication elements. Block 454 may direct the processor 330 to modify one or more of the valid selected authentication elements "user_id=abcd1234" and/or "secure_user_id=2345554345efghi". into one or more invalid test authentication elements, such as "user_id=null" and/or "secure_user_id=null", to generate the test request. The test request generated at 456 include: block may (a) "server.com/api/awesome_reviews/reviews/{review_id}" as the resource endpoint and (b) "user_id=null" and/or "secure_user_id=null" as one or more invalid test authentication elements.

Additionally or alternatively, in embodiments where the at least one selected request comprises a proxy request, the login tag or the signature may be the one or more valid selected authentication elements which are modified by block 456. Referring to the more specific example described above, in embodiments where the at least one selected request is a proxy request and the user is logged in, the at least one selected request may include (a) "server.com/api/awesome_reviews/reviews/{review_id}" as the interface address, and (b) "logged_in_user_id=abcd1234" and "signature=4c68c8624d737112c91818c11017d24d334b524cb5c2b8ba08daa056f7395ddb" as the one or more valid selected authentication elements. Block 454 may direct the processor 330 to modify one or more of the valid selected authentication elements "logged_in_user_id=abcd1234" and/or "signature=4c68c8624d737112c91818c11017d24d334b524cb5c2b8ba08daa056f7395ddb" into one or more invalid test authentication elements, such as "logged_in_user_id=null" and/or "signature=null" to generate the test request. The test request generated at block 456 may include: (a) "server.com/api/awesome_reviews/reviews/{review_id}" as the resource endpoint and (b) "logged_in_user_id=0" and/or "signature=null" as one or more invalid authentication elements. As a further example, in embodiments where the at least one selected request is a proxy request and the user is not logged in, the at least one selected request may include (a) "server.com/api/awesome_reviews/reviews/{review_id}" as the interface address, and (b) "secure_token=2345554345efghi" and "signature=4c68c8624d737112c91818c2019d24d334b524cb5c2b8ba08daa890987ddb" as the one or more valid selected authentication elements. Block 454 may direct the processor 330 to modify one or more of the valid selected authentication elements "secure_token=2345554345efghi" and/or "signature=4c68c8624d737112c91818c2019d24d334b524cb5c2b8ba08daa890987ddb" into one or more invalid test authentication elements, such as "secure_token=0" and/or "signature=null" to generate the test request.

In some embodiments, in embodiments where the at least one selected request comprises a proxy request, block 456 may only modify the login tag and not the signature, as the signature may be required to retrieve a substantially similar test resource response from the service servers 304 as the actual resource response to allow comparison of the test and actual resource responses. In this regard, as described above, in some embodiments, the signature may be an encryption of the entirety of the client request via HMAC, such that any changes in the client request (e.g., user ID, secure user ID) may result in a different signature. A random modification to the signature may also result in an invalid signature. A different or an invalid signature may retrieve different resources from the resource endpoint on the service servers 304 for reasons unrelated to proper authentication by the service servers 304. The service servers 304 may be unable to de-encrypt the different or invalid signature, or the different or invalid signature may not correspond to the same resource endpoint. In such embodiments, block 456 may only modify the login tag and maintain the signature. For example, block 454 may direct the processor 330 to modify the valid selected authentication element "logged_in_user_id=abcd1234" into one or more invalid test authentication elements, such as "logged_in_user_id=0" to generate the test request. The test request generated at block 456 may include: (a) "server.com/api/awesome_reviews/reviews/{review_id}" as the resource endpoint; (b) "logged_in_user_id=0" as one or more invalid test authentication elements; and (c) "signature=4c68c8624d737112c91818c11017d24d334b524cb5c2b8ba08daa056f7395ddb" may be retained as one or more valid authentication elements. As an additional example, block 454 may direct the processor 330 to modify the valid selected authentication element "secure_token=2345554345efghi" into one or more invalid test authentication elements, such as "secure_token=0" to generate the test request. The test request generated at block 456 may include: (a) "server.com/api/awesome_reviews/reviews/{review_id}" as the resource endpoint; (b) "secure_token=0" as one or more invalid test authentication elements; and (c) "signature=4c68c8624d737112c91818c2019d24d334b524cb5c2b8ba08daa890987ddb" may be retained as one or more valid authentication elements.

In embodiments where more than one address group or more than one selected request is selected at block 454, block 456 may involve modifying corresponding one or more selected authentication element of the selected request to generate the test request comprises modifying corresponding authentication elements in each selected request to generate a plurality of test requests.

The security test process 450 then continues to block 458, which may include codes directing the processor 330 to transmit the test request to the service servers 304. For example, block 408 may direct the processor 330 to transmit the test request to the service servers 304 at the resource endpoint included in the test request via the I/O interface 336.

Block 458 may direct the processor 330 to transmit the test request asynchronously with a timestamp of the at least selected request indicating when the client request used to generate the at least one selected request was received at the proxy server 302 and/or when the proxy request generated based on that client request was relayed to the resource endpoint of the service servers 304. In some embodiments, the processor 330 may transmit the test request after the defined period of time from the timestamp associated with the at least one selected request. In other embodiments, the processor 330 may transmit the test request after the defined period of time has passed since a previous instance of block 458 was executed to transmit (a) any test request or (b) a test request based on a request selected from a same address group.

In response to the test request including the invalid authentication element, a service server 304 addressed by the test request may provide the test resource response to the proxy server 302. The security test process 450 then continues to block 460, which may include codes for directing the processor 330 to assess the test resource response to determine whether the service server 304 is properly authenticating the one or more authentication elements in client or proxy requests to the resource endpoint. For example, block 460 may direct the processor 330 to compare the test resource response received in response to the test request to the actual resource response received in response to the selected request (e.g., stored in association with the selected request after block 410 of relay process 400) to determine whether there are any differences between the test resource response and the actual resource response. If there are no differences, the processor 330 may determine that the service server 304 is not properly authenticating the at least one authentication element in client or proxy requests to the resource endpoint; if there are differences, the processor 330 may determine that the service servers 304 are properly authenticating the one or more authentication elements in client or proxy requests. Additionally or alternatively, block 460 may direct the processor 330 to assess the test resource response received in response to the test request for personal information, such as "firstname", "lastname", "email", "address", "country", "city", "phone", "phonenumber", "dateofbirth", etc. If there is any personal information, the processor 330 may determine that the service server 304 is not properly authenticating the one or more authentication element in client or proxy requests to the resource endpoint at the service server 304; if there is no personal information, the processor 330 may determine that the service server 304 is properly authenticating the one or more authentication elements in client or proxy requests. Examples of methods of assessment of personal information are described in patent publication no. US20220121778A1, titled "Systems and methods for modifying computer-executable instructions to remove personal information", incorporated by reference herein in its entirety.

If at block 460, the processor 330 determines that the service server 304 is not properly authenticating the one or more authentication element in client or proxy requests to the resource endpoint of the service server 304, the security test process 450 may then continue to block 462, which may include codes directing the processor 330 to flag the service server 304 and/or the resource endpoint of the service server 304 for further action. The further action may include transmitting a warning notification message to an operator of the service server 304. The further action may also involve ceasing relay of any client requests to the resource endpoint or to any resource endpoints grouped into the same address group as the interface address or even to any resource endpoints at the service server 304. the address group. The security test process 450 then return to block 452 for another iteration of the security test process 450.

If at block 460, the processor 330 determines that the service server 304 is properly authenticating the one or more authentication element in client or proxy requests to the resource endpoint at the service server 304, the security test process 450 may then directly return back to block 452 for another iteration of the security test process 450.

Alternative Method 500

Figure 5:
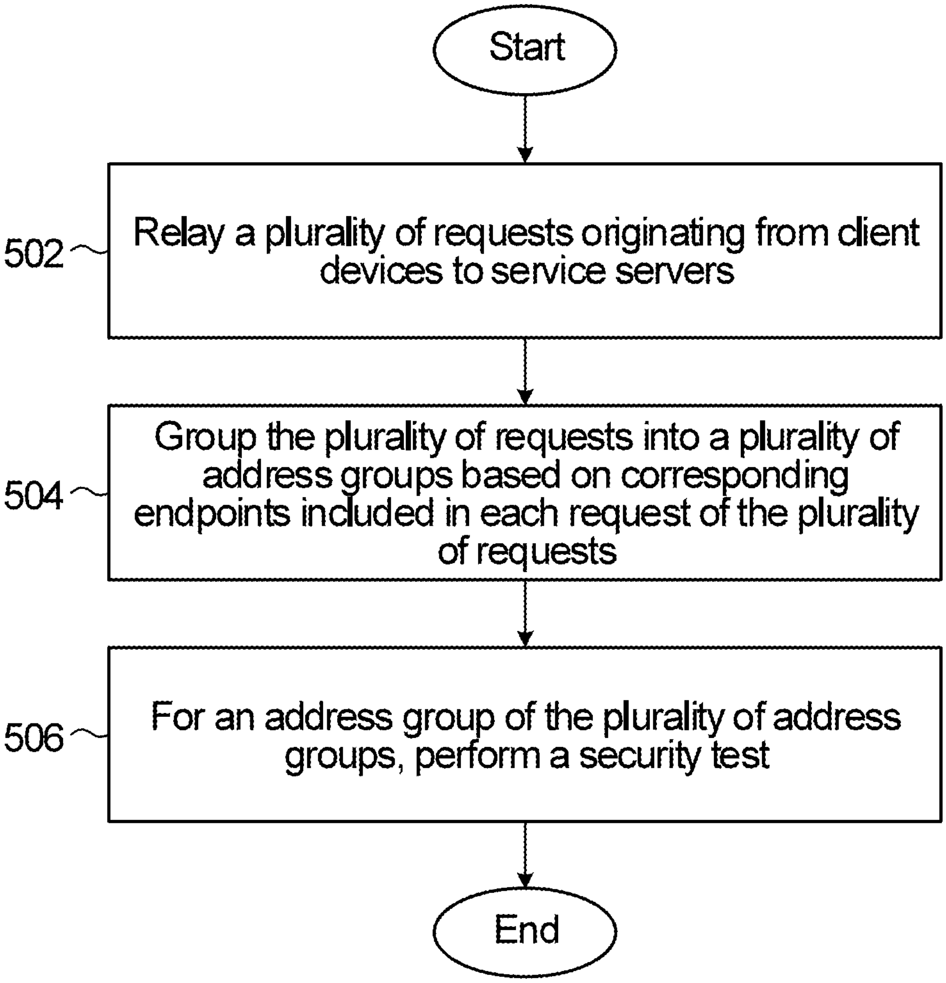
FIG. 5 is a flowchart of computer-implemented method for grouping a plurality of requests and performing a security test at the proxy server in accordance with one embodiment.

Referring to FIGS. 2 and 5, a computer-implemented method for performing a security test on a resource endpoint at the service servers 304 using the proxy server 302 is generally shown at 500. In the embodiment shown, the method 500 is performed by the processor 330 executing processor, machine and/or computer readable instructions stored in the program memory 334. In other embodiments, the method 500 may comprise processor, machine and/or computer readable instructions alternatively stored on other non-transitory computer readable storage medium such as a CD-ROM, a floppy disk, a hard drive, a DVD, a Blu-ray disk or another component associated with the proxy server 302; in yet other embodiments, the method 500 and/or parts thereof could alternatively be executed by a device other than the processor 330, including for example, by the client devices 306. Further, although the method 500 in accordance with one embodiment is described with reference to the flowchart illustrated in FIG. 5, other methods of implementing the method 500 may alternatively be used. For example, the order of execution of the blocks may be altered, and/or some of the blocks described may be altered, eliminated, or combined.

At block 502, the proxy server 302, in communication with the client devices 306 and the service servers 304, may relay a plurality of requests originating from the client devices 306 to the service servers 304, each request of the plurality of requests addressing a corresponding endpoint at the service servers 304. Block 502 may include codes similar to blocks 402, 404, 406 and 408 of the relay process 400 described above. The plurality of requests may comprise a plurality of client requests received from the client devices 306 and unmodified by the proxy server 302. Additionally or alternatively, the plurality of requests may comprise a plurality of proxy requests generated by the proxy server 302 by modifying corresponding client requests received from the client devices 306 in a manner similar to block 406 of the relay process 400 described above.

In some embodiments, the proxy server 302 may also store the plurality of requests received at block 502 to maintain a directory of resource endpoints at the service servers 304 in a manner similar to block 408 of the relay process 400. For example, the proxy server 302 may store the plurality of requests in the request datastore 401.

At block 504, the proxy server 302 may group the plurality of requests into a plurality of address groups based on the corresponding endpoint included in each request of the plurality of requests. Block 504 may include codes similar to block 452 of the security test process 450. For example, requests of the plurality of requests which have a same resource endpoint except for an identifier of that same resource endpoint may be grouped together into an address group of the plurality of address groups. The identifier of the resource endpoints may comprise at least one of a resource identifier, a user identifier, an email identifier, or an alphanumeric identifier. Identifiers of resource endpoints grouped into a same address group of the plurality of address groups vary within an identifier match standard.

At block 506, the proxy server 302 performs a security test for an address group of the plurality of address groups. Block 506 may include codes similar to block 454, 456, 458, 460 and 462 of the security test process 450. For example, block 506 may direct the proxy server 302 to select a selected request from an address group of the plurality of address groups, wherein the selected request includes a selected resource endpoint at the service servers 304 and a selected authentication element. In embodiments where the selected request is a client request or a proxy request, the selected authentication element may be the user ID and/or the secure user ID. In embodiments where the selected request is a proxy request, the selected authentication element may be the login tag and/or the signature. The selected request may be selected from the address group randomly or may be selected from the address group based on at least one characteristic associated with the selected request. The at least one characteristic may the timestamp of the client or proxy requests in the address group, variations in the resource endpoints of the client or proxy requests in the address group, status of the one or more authentication elements in the client or proxy requests in the address group and/or whether the client or proxy requests in the address group is already associated with an actual resource response from the service server 304.

Block 506 may also direct the proxy server 302 to modify the selected authentication element to generate a test request including the selected resource endpoint and a test authentication element. The selected authentication element may be a valid version of the authentication element. The test authentication element may be an invalid version of the authentication element. In some embodiments, block 506 may direct the proxy server 302 to select a plurality of selected requests from the address group, and to modify corresponding authentication elements in each selected request of the plurality of selected requests to generate a plurality of test requests. Block 506 may also direct the proxy server 302 to transmit the test request to the selected resource endpoint in the test request.

In some embodiments, method 500 may further involve receiving, at the proxy server 302, a test response from the selected resource endpoint at the service servers 304 in response to the test request. The method 500 may direct the proxy server 302 to compare the test response to an actual response received from the selected endpoint at the service servers 304 in response to the selected request to determine security of the selected endpoint. The method 500 may also direct the proxy server 302 to analyze the test response for personal information to determine the security of the selected endpoint. Method 500 may include codes similar to block 460 of the security test process 450. The security of the selected endpoint may extrapolated as security of a plurality of endpoints within the address group that the selected endpoint is grouped into or as security of the entire address group itself.

Figure 6:
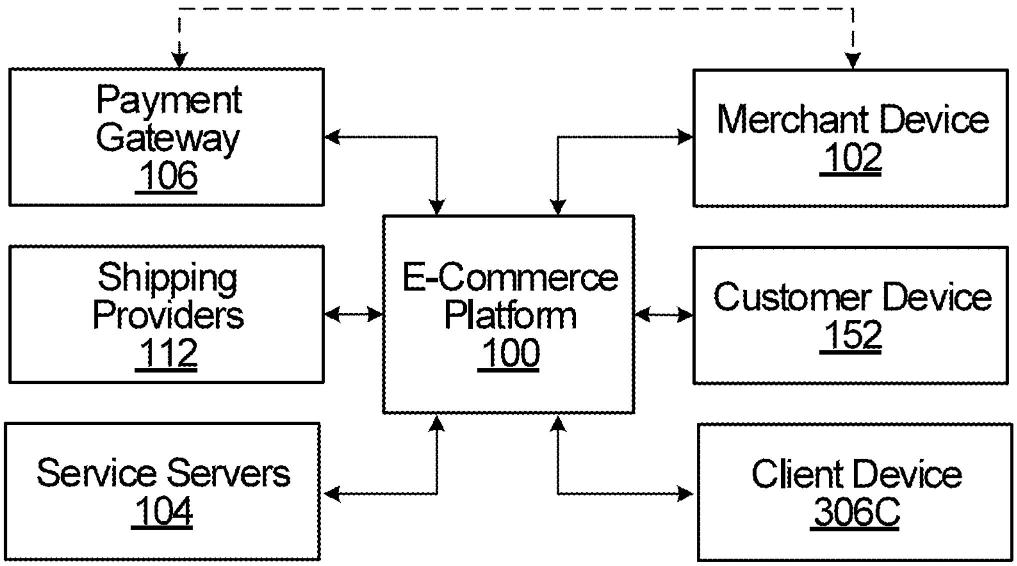
FIG. 6 is a block diagram of a system for delivering content in accordance with another embodiment including an example e-commerce platform.

FIG. 6 illustrates an example in which the components of the system 300 of FIG. 1 comprise components of a commerce platform, whereby the proxy server 302 of FIG. 3 comprises an e-commerce platform 100. The client devices 306 may include a customer device 150 and a merchant device 102. The service servers 304 may include a payment gateway 106 which may facilitate payment services 120 offered by the e-commerce platform 100 and shipping providers 112 which may facilitate shipping services 122 offered by the e-commerce platform 100. The customer device 150 and/or the merchant device 102 may generate the plurality of requests to access resources hosted or stored by the payment gateway 106 and/or the shipping providers 112 and which may be relayed by the e-commerce platform 100 to the payment gateway 106 and/or the shipping providers 112. The payment gateway 106 and/or the shipping providers 112 may generate the plurality of resource responses in response to the plurality of requests, which may be relayed by the e-commerce platform 100 to the customer device 150 and/or the merchant device 102. One example of e-commerce platform 100 is described below for completeness.

CONCLUSION

While specific embodiments have been described and illustrated, such embodiments should be considered illustrative of the subject matter described herein and not as limiting the claims as construed in accordance with the relevant jurisprudence.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g., read-only-memory (ROM) or a disk), or memory that is volatile (e.g., random access memory (RAM)). The memory may be distributed, e.g., a same memory may be distributed over one or more servers or locations.

The invention claimed is:

1. A computer-implemented method comprising:
relaying, via a proxy server in communication with client devices and service servers, a plurality of requests originating from the client devices to the service servers, each request of the plurality of requests addressing a corresponding endpoint at the service servers;
grouping, by the proxy server, the plurality of requests into a plurality of address groups based on the corresponding endpoint included in each request; and
for an address group of the plurality of address groups, performing a security test, the security test comprising:
selecting, with the proxy server, a selected request from the address group, wherein the selected request includes a selected endpoint at the service servers and a selected authentication element;
modifying, with the proxy server, the selected authentication element into a test authentication element to generate a test request including the selected endpoint and the test authentication element; and
transmitting the test request to the selected endpoint.

2. The method of claim 1, wherein the test authentication element comprises at least one of an invalid authentication element, a null user identifier, a null secure user identifier, a zero-valued logged-in user identifier, a zero-valued secure token, or a null signature.

3. The method of claim 1, further comprising storing, by the proxy server, the plurality of requests to maintain a directory of endpoints at the service servers.

4. The method of claim 1, wherein grouping the plurality of requests comprises grouping requests of the plurality of requests which have a same endpoint except for an identifier in that same endpoint together into one address group of the plurality of address groups.

5. The method of claim 4, wherein identifiers in endpoints in a same address group of the plurality of address groups vary within an identifier match standard.

6. The method of claim 4, wherein the identifier in the same endpoint comprises at least one of a resource identifier, a user identifier, an email identifier or an alphanumeric identifier.

7. The method of claim 1, wherein the selected request is selected from the address group randomly or is selected from the address group based on at least one characteristic associated with the selected request.

8. The method of claim 1, wherein:
selecting the selected request from the address group comprises selecting a plurality of selected requests from the address group, and
modifying the selected authentication element into the test authentication element to generate the test request comprises modifying corresponding authentication elements into corresponding test authentication elements in each selected request of the plurality of selected requests to generate a plurality of test requests.

9. The method of claim 1, further comprising:
receiving, at the proxy server, a test response from the selected endpoint in response to the test request; and
comparing, by the proxy server, the test response to an actual response received from the selected endpoint in response to the selected request to determine security of the selected endpoint.

10. The method of claim 1, further comprising:
receiving, at the proxy server, a test response from the selected endpoint in response to the test request; and
assessing, by the proxy server, the test response for personal information to determine security of the selected endpoint.

11. The method of claim 10, wherein the security of the selected endpoint is extrapolated as security of a plurality of endpoints within the address group or as security of the address group.

12. A system comprising:
at least one processor of a proxy server, the proxy server in communication with client devices and service servers; and
a memory storing processor-executable instructions that, when executed, cause the at least one processor to at least:
relay a plurality of requests originating from the client devices to the service servers, each request of the plurality of requests addressing a corresponding endpoint at the service servers;
group the plurality of requests into a plurality of address groups based on the corresponding endpoint included in each request; and
for an address group of the plurality of address groups, perform a security test, wherein the processor-executable instructions which cause the at least one processor to perform the security test comprise processor- executable instructions that cause the at least one processor to at least:
select a selected request from the address group, wherein the selected request includes a selected endpoint at the service servers and a selected authentication element:
modify the selected authentication element into a test authentication element to generate a test request including the selected endpoint and the test authentication element; and
transmit the test request to the selected endpoint.

13. The system of claim 12, wherein the test authentication element comprises at least one of an invalid authentication element, a null user identifier, a null secure user identifier, a zero-valued logged-in user identifier, a zero-valued secure token. or a null signature.

14. The system of claim 12, wherein the memory further stores processor-executable instructions that cause the at least one processor to at least store the plurality of requests to maintain a directory of endpoints at the service servers.

15. The system of claim 12, wherein the processor-executable instructions that cause the at least one processor to group the plurality of requests comprise processor-executable instructions that cause the at least one processor to at least group requests of the plurality of requests which have a same endpoint except for an identifier in the same endpoint together into one address group of the plurality of address groups.

16. The system of claim 15, wherein identifiers in endpoints in a same address group of the plurality of address groups vary within an identifier match standard.

17. The system of claim 12, wherein the processor-executable instructions that cause the at least one processor to select the selected request comprise processor-executable instructions that cause the at least one processor to at least select the selected request from the address group randomly or based on at least one characteristic associated with of the selected request.

18. The system of claim 12, wherein the memory further stores processor-executable instructions that cause the at least one processor to at least:

receive a test response from the selected endpoint in response to the test request; and compare the test response to an actual response received from the selected endpoint in response to the selected request to determine security of the selected endpoint or assess the test response for personal information to determine the security of the selected endpoint.

19. The system of claim 18, wherein the memory further stores processor-executable instructions that cause the at least one processor to at least extrapolate the security of the selected endpoint as security of a plurality of endpoints within the address group or as security of the address group.

20. A non-transitory computer-readable storage medium having stored thereon computer-executable instructions that, when executed, cause at least one processor of a proxy server in communication with client devices and service servers to perform operations comprising:

relaying a plurality of requests originating from the client devices to the service servers, each request of the plurality of requests addressing a corresponding endpoint at the service servers;

grouping the plurality of requests into a plurality of address groups based on the corresponding endpoint included in each request; and for an address group of the plurality of address groups, performing a security test, wherein performing the security test comprises:

selecting a selected request from the address group, wherein the selected request includes a selected endpoint at the service servers and a selected authentication element;

modifying the selected authentication element into a test authentication element to generate a test request including the selected endpoint and the test authentication element; and transmitting the test request to the selected endpoint.

* * * * *